R. M. CAROTHERS.
REGULATOR FOR PHASE BALANCERS.
APPLICATION FILED APR. 27, 1916.
1,235,436.
Patented July 31, 1917.
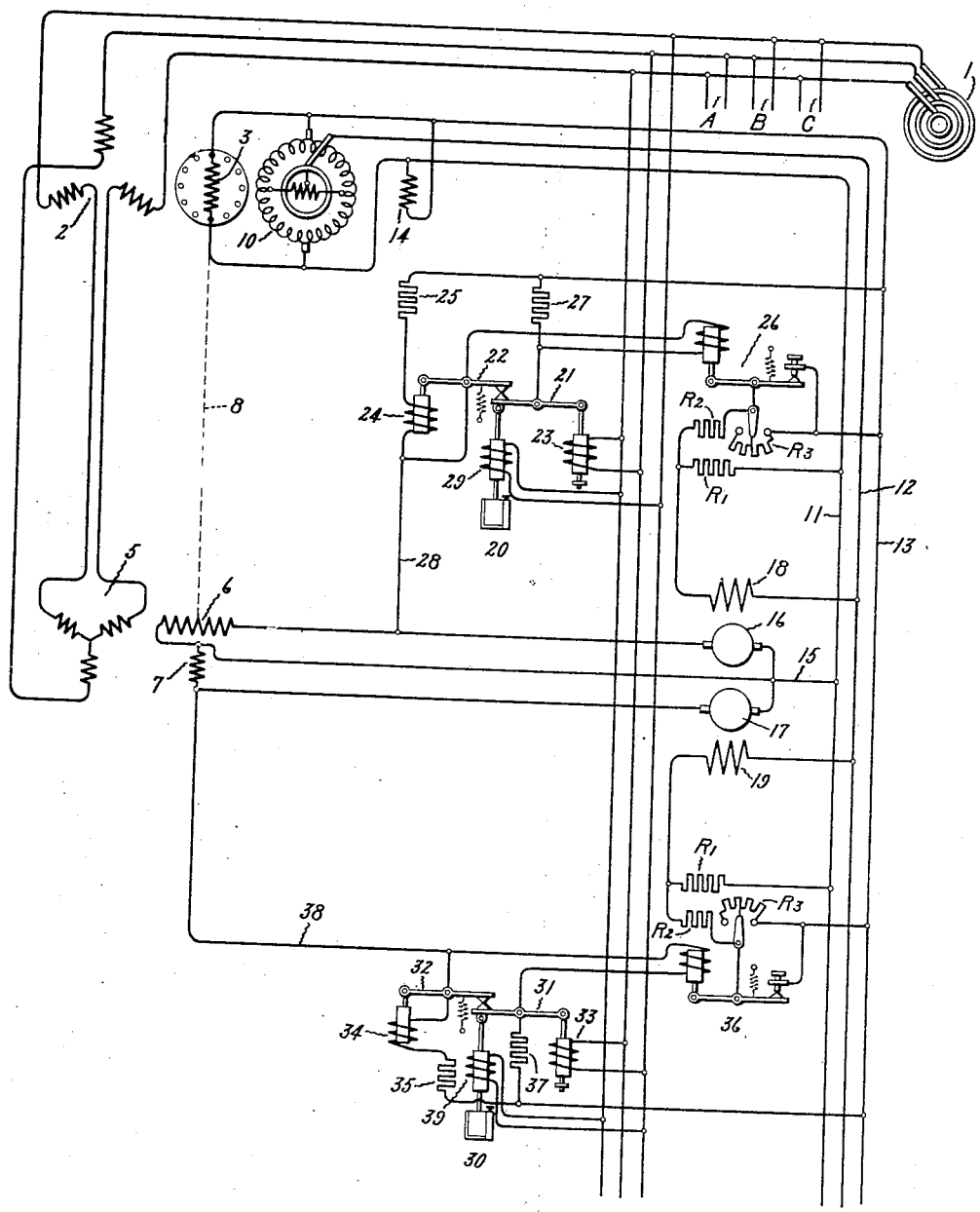
Inventor:
Robert M. Carothers,
by Albert G. Davis
His Attorney

UNITED STATES PATENT OFFICE.

ROBERT M. CAROTHERS, OF SCHENECTADY, NEW YORK, ASSIGNOR TO GENERAL ELECTRIC COMPANY, A CORPORATION OF NEW YORK.

REGULATOR FOR PHASE-BALANCERS.

1,235,436.   Specification of Letters Patent.   Patented July 31, 1917.

Application filed April 27, 1916. Serial No. 94,028.

*To all whom it may concern:*

Be it known that I, ROBERT M. CAROTHERS, a citizen of the United States, residing at Schenectady, county of Schenectady, State of New York, have invented certain new and useful Improvements in Regulators for Phase-Balancers, of which the following is a specification.

This invention relates to a regulator for controlling a phase balancer for polyphase transmission systems.

A phase balancer of the type to which my invention is particularly applicable is disclosed in the patent to Alexanderson, No. 1,093,594, granted April 21, 1914, as applied to a system in which a single-phase load is connected to one phase of a three-phase system. In said patent a synchronous dynamo-electric machine is connected with an auxiliary dynamo-electric machine or booster in such manner that the phase rotation of said machines is opposite, and means is provided for relatively changing the phase relation of the voltage of said machines, comprising a booster field winding having relatively displaced portions. When such a phase balancer is applied to a system where single phase loads are taken from more than one phase, some provision must be made for controlling the balancer so as to maintain equality of voltages, or equality of currents, in the phases of the system.

My invention relates to an arrangement of regulators by means of which a phase balancer of the type described may be automatically controlled so as to maintain equality of voltages or currents in the phases of the system.

In order to most effectively attain this result, the action of the phase balancer should be sometimes in one direction and sometimes in the other, depending upon which phase has the heavier load, and the regulators should be arranged to control both the magnitude and direction of the excitation applied to the portions of the booster field winding. My invention will, therefore, preferably be combined with the arrangement shown in the application of Ernst F. W. Alexanderson, Ser. No. 92,155 filed of even date herewith. To this end I control one of the moving contacts of each of two regulators, when considering a three-phase system, by the ratio of the voltages of a common phase and another phase and preferably control the other contact by means of a solenoid responsive to the algebraic sum of the voltage applied to one portion of the booster field and a relatively fixed voltage.

My invention will be more readily understood from a consideration of the following specification taken in connection with the accompanying drawing, in which the single figure shows diagrammatically one way in which vibrating regulators may be arranged according to my invention for controlling a phase balancer in a system of the type described.

Let us consider that the generator 1 is supplying power to a three-phase system to which single phase loads are applied, as indicated, on phases A, B and C. Connected to this system is a phase balancer set of the type described in the Alexanderson patent, which set comprises a synchronous dynamo-electric machine 2 provided with a field winding 3 and an auxiliary machine or booster 5 provided with a field winding having relatively displaced portions 6 and 7. The rotating members of these machines are mechanically connected as indicated by the dotted line 8. As described in the Alexanderson patent, the portions 6 and 7 are preferably relatively displaced so that their magnetic axes stand at approximately ninety electrical degrees. I then provide a three-wire generator 10, having a field winding 14, and supplying the mains 11, 12, and 13. Of these, the main 12 is a neutral having a potential approximately midway between the potentials of the mains 11 and 13. The portions 6 and 7 of the booster field winding are then excited from the exciters 16 and 17, which have a common terminal connected by a conductor 15 with the main 11 for a purpose to be later explained. These exciters 16 and 17 have field windings 18 and 19, respectively, each of which has one terminal connected to the neutral 12 and the other terminal to an intermediate point of a group of resistances $R_1$, $R_2$, and $R_3$ connected in series across the mains 11 and 13. This connection will preferably be made between the resistances $R_1$ and $R_2$, and the resistances will be so designed that $R_1$ is greater than $R_2$, but that $R_2$ plus $R_3$ is greater than $R_1$. The resistance $R_3$ may be made adjustable.

I then provide a reguluator 20 of the vibrating type for controlling the exciter 16 and, consequently, the excitation of the portion 6 of the booster field winding. Similarly, I provide a regulator 30 for controlling the exciter 17 and portion 7 of the booster field winding. In common with regulators of this type, the regulator 20 comprises two pivoted contact arms 21 and 22 provided with solenoids 23, 24, and 29. Of these, the solenoid 23 is responsive to an energy component, here the voltage on phase A of the source of supply, and its pull is opposed by that of solenoid 29, responsive to the voltage on phase C. The coil 24, commonly known as the anti-hunting coil, is connected, through the current-limiting resistance 25, to the main 13 of the three-wire generator, and through the conductor 28 to the free side of the exciter 16. The voltage applied to this anti-hunting coil is, therefore, because of the conductor 15, the algebraic sum of the voltage across the mains 11 and 13 of the three-wire generator 10 and of the voltage of the exciter 16. A relay 26 is arranged in parallel with the anti-hunting coil, the circuit therefor being made through a current-limiting resistance 27. This relay is arranged to short-circuit the resistance $R_3$ when deënergized, and is deënergized by being short-circuited by the contacts of the arms 21 and 22 when these are in closed position. In the regulator 30, the numerals 31 to 39, inclusive, refer to exactly similar parts as the numerals 21 to 29, inclusive, in the regulator 20. It will be seen that the coil 33 of this regulator is responsive to the voltage on phase B of the source of supply, while the coil 39 is responsive to the voltage on phase C in common with the coil 29 of regulator 20. The anti-hunting coil 34 is responsive to the algebraic sum of the voltage of the three-wire generator and the voltage of the exciter 17. The coils 23, 29, 33, and 39 might equally well be made responsive to some other energy component, such as the current in phases A, B, and C, if it were desired.

Owing to the design of the resistances $R_1$, $R_2$, and $R_3$ the voltage applied to the field windings 18 and 19 will be reversed by the short-circuiting of the resistance $R_3$, it being noted that when this resistance is short-circuited, the voltage applied to these field windings will be that between the mains 12 and 13, while when the resistance $R_3$ is inserted, the voltage applied will be that between the mains 11 and 12. If, now, the times of opening and closing of the main contacts, and hence of the relay contacts, are equal, the resultant voltage supplied by the exciters 16 and 17 will be zero, this corresponding to the condition of balanced load. When the load becomes unbalanced, then the contact arms 21 or 31 will assume a new position, and the relative times of opening and closing of the contacts will be varied. If the contacts remain in a closed position for a greater percentage of the time, then the exciter voltage will be positive, for example, while if they remain open for the greater percentage of the time, then the exciter voltage will be reversed. During this operation, however, it will be seen that the anti-hunting coils and the relay coils are responsive to a voltage which is the algebraic sum of a relatively fixed voltage—namely, that between the mains 11 and 13—and a voltage—that of the exciters 16 and 17—which is variable in magnitude and direction.

In the practical working out of the arrangement, it will be found desirable to make the voltage across the mains 11 and 13 approximately twice as great as the rated voltage of the exciters 16 and 17. As a result, the voltage applied to the anti-hunting coils is always maintained at a value at least as large as half of that across the mains 11 and 13, and this will be chosen so as to be sufficiently large for the satisfactory operation of the regulator.

It will be seen, then, that I have provided a regulator 20 which is trying to maintain the voltage on phase A equal to the voltage on phase C, and a regulator 30 which is trying to maintain the voltage on phase B equal to the voltage on phase C, the net result being that the voltages on phases A and B are maintained equal to a common voltage, and hence to each other. Preferably, this operation will be carried out by controlling both the magnitude and the direction of the voltage applied to the relatively displaced portions of the booster field winding, while at the same time the regulating will be so arranged that a voltage of sufficient magnitude for satisfactory operation is applied to the anti-hunting coil of the regulator.

Although I have herein shown and described one specific embodiment of my invention, it will be understood that various modifications and changes may be made therein without departing from the scope and spirit of the invention as expressed in the appended claims.

What I claim as new and desire to secure by Letters Patent of the United States, is:

1. In combination, a polyphase circuit having an unbalanced load thereon, a phase balancer for balancing a component of the energy in said circuit comprising a field winding having relatively displaced portions, means for exciting each portion of said field winding, and means for controlling the voltage of each exciting means, comprising a moving contact controlled by means responsive to the ratio of an energy component of two different phases of said polyphase circuit.

2. In combination, a polyphase circuit having an unbalanced load thereon, a phase balancer for balancing a component of the energy in said circuit comprising a field winding having relatively displaced portions, an exciter for each portion of said field winding, and means for controlling the magnitude and direction of the voltage of each exciter, comprising a moving contact controlled by means responsive to the ratio of an energy component of two different phases of said polyphase circuit.

3. In combination, a polyphase circuit having an unbalanced load thereon, a phase balancer for balancing a component of the energy in said circuit comprising a field winding having relatively displaced portions, an exciter for each portion of said field winding, an automatic regulator for controlling the magnitude and direction of the voltage of each exciter, comprising a moving contact controlled by solenoids responsive, respectively, to the voltage of the two different phases of said polyphase circuit.

4. In combination, a polyphase circuit having an unbalanced load thereon, a phase balancer for balancing a component of the energy in said circuit comprising a field winding having relatively displaced portions, an exciter for each portion of said field winding, a regulator for controlling the voltage of each exciter, each regulator comprising a moving contact controlled by means responsive to the ration of an energy component of a common phase and another phase of said polyphase circuit.

5. In combination, a polyphase circuit having an unbalanced load thereon, a phase balancer for balancing a component of the energy in said circuit comprising a field winding having relatively displaced portions, an exciter for each portion of said field winding, a regulator for controlling the magnitude and direction of the voltage of each exciter, each regulator comprising a moving contact controlled by means responsive to the ratio of an energy component of a common phase and another phase of said polyphase circuit.

6. In combination, a polyphase circuit having an unbalanced load thereon, a phase balancer for balancing a component of the energy in said circuit comprising a field winding having relatively displaced portions, an exciter for each portion of said field winding, a regulator for controlling the magnitude and direction of the voltage of each exciter, each regulator comprising a moving contact controlled by means responsive to the ratio of the voltage of a common phase and another phase of said polyphase circuit.

7. In combination, a polyphase circuit having an unbalanced load thereon, a phase balancer for balancing a component of the energy in said circuit comprising a field winding having relatively displaced portions, an exciter for each portion of said field winding, a regulator for controlling the magnitude and direction of the voltage of each exciter, each regulator comprising a moving contact controlled by means responsive to the ratio of an energy component of a common phase and another phase of said polyphase circuit, and a coöperating moving contact controlled by means responsive to the algebraic sum of the voltage of its exciter and a relatively fixed voltage.

In witness whereof, I have hereunto set my hand this 26th day of April, 1916.

ROBERT M. CAROTHERS.